(12) United States Patent
Ma (10) Patent No.: US 10,984,383 B2
(45) Date of Patent: Apr. 20, 2021

(54) BOOK INFORMATION COLLABORATION SYSTEM AND METHOD

(71) Applicant: SHANGHAI YIWEI NETWORK TECHNOLOGY CO., LTD., Shanghai (CN)

(72) Inventor: Zhengfang Ma, Shanghai (CN)

(73) Assignee: SHANGHAI YIWEI NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/726,242

(22) Filed: Dec. 24, 2019

(65) Prior Publication Data

US 2020/0234240 A1    Jul. 23, 2020

Related U.S. Application Data

(63) Continuation of application No. PCT/CN2018/092667, filed on Jun. 25, 2018.

(30) Foreign Application Priority Data

Jun. 26, 2017   (CN) .......................... 201710494157.8

(51) Int. Cl.
*G06F 3/048*      (2013.01)
*G06Q 10/10*      (2012.01)
(Continued)

(52) U.S. Cl.
CPC ......... *G06Q 10/101* (2013.01); *G06F 40/169* (2020.01); *G06F 40/174* (2020.01);
(Continued)

(58) Field of Classification Search
CPC .... G06F 3/0482; G06F 3/04842; G06F 16/93; G06F 40/103; G06F 40/166;
(Continued)

(56) References Cited

U.S. PATENT DOCUMENTS

| | | | |
|---|---|---|---|
| 7,216,117 B2 | 5/2007 | Smith | |
| 2010/0004944 A1* | 1/2010 | Palaniappan | G06Q 10/10 705/1.1 |

(Continued)

FOREIGN PATENT DOCUMENTS

| | | |
|---|---|---|
| CN | 103761092 A | 4/2014 |
| CN | 103823879 A | 5/2014 |

*Primary Examiner* — Claudia Dragoescu (57) ABSTRACT

The present invention discloses a book information collaboration system and method, which can improve the efficiency of information exchange among readers of a same book and be advantageous for the readers to enhance the understanding of the book in a collaborative manner. The technical solutions are as follows: an open collaboration group is generated when a certain book is created for the first time, and a default entry structure using this book as a root entry is also generated. The entry structure involves various contents such as book publication information, book content reconstruction and reader comments. A user who searches, reads or attempts to recreate this book subsequently will be automatically added in this collaboration group. Only members in the collaboration group can edit the entry structure. The updated entry structure is displayed in real time to the members in the collaboration group.

4 Claims, 5 Drawing Sheets

(51) Int. Cl.
  *G06F 40/169* (2020.01)
  *G06F 40/30* (2020.01)
  *G06F 40/174* (2020.01)
  *H04L 29/06* (2006.01)
  *H04L 29/08* (2006.01)

(52) U.S. Cl.
  CPC ............ *G06F 40/30* (2020.01); *H04L 65/403* (2013.01); *H04L 67/10* (2013.01)

(58) Field of Classification Search
  CPC .... G06F 40/197; G06Q 10/10; G06Q 10/101; G06Q 10/103
  See application file for complete search history.

(56) References Cited

U.S. PATENT DOCUMENTS

2012/0323842 A1* 12/2012 Izhikevich ............ G06Q 10/10
  707/608
2017/0206258 A1* 7/2017 Awasthi ................. G06F 16/34

* cited by examiner

BOOK INFORMATION COLLABORATION SYSTEM AND METHOD

CROSS-REFERENCE TO RELATED APPLICATIONS

This application is a continuation of International Patent Application No. PCT/CN2018/092667 filed on Jun. 25, 2018, which claims the benefit of priority from Chinese Patent Application No. 201710494157.8, filed on Jun. 26, 2017. The contents of the aforementioned application, including any intervening amendments thereto, are incorporated herein by reference in its entirety.

TECHNICAL FIELD

The present invention relates to a book information gathering platform and in particular to a socialized collaboration system and processing method for book information resources.

BACKGROUND OF THE PRESENT INVENTION

The socialization of conventional e-book resource platforms is generally realized by building a community in which a post is published by a user and replied by other users. Such community-based book platforms have some disadvantages. For example, the discussion topics are disorganized; the discussions on a same book may be found in posts in various communities; and the discussions on multiple books may be often found in posts in a single community. Moreover, such discussions are scattered and fragmented, without correlation. Readers are unable to acquire, from such communities, the comprehensive understanding and associated information of a certain book.

SUMMARY OF THE PRESENT INVENTION

The brief summary of one or more aspects will be given below to provide the basic understanding of these aspects. This summary is not an exhaustive overview of all contemplated aspects, and is not intended to identify key or decisive elements of all aspects or attempt to define the scope of any or all aspects. It is given merely to provide some concepts of one or more aspects in a simplified form, as the foreword of detailed descriptions to be given later.

An objective of the present invention is to provide a book information collaboration system and method to solve the above problems, which can improve the efficiency of information exchange among readers of a same book and be advantageous for the readers to enhance the understanding of the book in a collaborative manner.

The present invention employs the following, technical solutions. The present invention discloses a book information collaboration system, including:

a terminal device, the terminal device including an application-specific integrated circuit; and a cloud server coupled to the terminal device via a communication medium, the cloud server including one or more processors and a non-volatile memory storing instructions, wherein:

the instructions, when executed, cause the one or more processors to receive instructions from the terminal device via the communication medium, the non-volatile memory of the cloud server includes:

a storage module configured to store book information;

a collaborative generation module configured to, when a book is created for the first time, generate an open collaboration group using the book as a center and create a preset entry structure using the book as a root entry;

a collaborative addition module configured to, when it is detected that a book object operated by a user is already created, automatically add the user in the open collaboration group corresponding to the created book, wherein the user's operation to the book includes search, read or create;

an entry edition module configured to allow members in the collaboration group to edit the entry structure corresponding to the collaboration group; and an entry display module configured to display in real time, to members in the collaboration group, the latest content of the entry structure edited by the members in the collaboration group.

In accordance with an embodiment of the book information collaboration system of the present invention, the book information includes, but is not limited to, book publication information and the entry structure of the book; the book publication information includes author, press and version; and, the entry structure of the book includes reconstruction of book contents by a user, multi-dimensional contents of the book, reader comments, reading motivations, and relevant contents of the book.

In accordance with an embodiment of the book information collaboration system of the present invention, the non-volatile memory of the cloud server further includes:

an administration authority setting module configured to set an edition administration authority of the collaboration group, including granting an edition administration authority to a creator of the collaboration group by default.

In accordance with an embodiment of the book information collaboration system of the present invention, the non-volatile memory of the cloud server further includes:

an intelligent merging module configured to merge the same or similar contents in the entry structure of the book by semantic recognition, including the same or similar reconstruction of book contents by users, the same or similar multi-dimensional contents of the book, the same or similar reader comments, the same or similar reading motivations and the same or similar relevant contents of the book.

The present invention further discloses a book information collaboration method, including steps of:

transmitting instructions to a cloud server by a terminal device via a communication medium, the cloud server comprising one or more processors and a non-volatile memory storing instructions;

when a book is created for the first time, generating, by a collaborative generation module of the non-volatile memory, an open collaboration group using the book as a center and creating a preset entry structure using the book as a root entry;

when it is detected that a book object operated by a user is already created, automatically adding, by a collaborative addition module of the non-volatile memory, the user in the open collaboration group corresponding to the created book, wherein the user's operation to the book comprises search, read or create;

allowing, by an entry edition module of the non-volatile memory, members in the collaboration group to edit the entry structure corresponding to the collaboration group; and displaying in real time, by an entry display module of the non-volatile memory and to members in the collaboration group, the latest content of the entry structure edited by the members in the collaboration group.

In accordance with an embodiment of the book information collaboration method of the present invention, the book information includes, but is not limited to, book publication information and the entry structure of the book; the book publication information includes author, press and version; and, the entry structure of the book includes reconstruction of book contents by a user, multi-dimensional contents of the book, reader comments, reading motivations, and relevant contents of the book.

In accordance with an embodiment of the book information collaboration method of the present invention, the method further includes a step of:

setting, by an administration authority setting module, an edition administration authority of the collaboration group, including granting an edition administration authority to a creator of the collaboration group by default.

In accordance with an embodiment of the book information collaboration method of the present invention, the method further includes a step of:

merging, by an intelligent merging module, the same or similar contents in the entry structure of the book by semantic recognition, including the same or similar reconstruction of book contents by users, the same or similar multi-dimensional contents of the book, the same or similar reader comments, the same or similar reading motivations and the same or similar relevant contents of the book.

Compared with the prior art, the present invention has the following beneficial effects. In the solutions of the present invention, an open collaboration group is generated when a certain book is created for the first time, and a default entry structure using this book as a root entry is also generated. The entry structure involves various contents such as book publication information, book content reconstruction and reader comments. A user who searches, reads or attempts to recreate this book subsequently will be automatically added in this collaboration group. Only members in the collaboration group can edit the entry structure based on this book. The edited and updated entry structure is displayed in real time to the members in the collaboration group. Each collaboration group corresponds to one book and one entry structure. Additionally, the system will also merge the same or similar entries. Compared with the conventional technologies, in the present invention, by using each boa as a unit, one collaboration group is formed for one book to edit and display an entry structure: of the book. The association among users who read a same book is enhanced. New users can join in the collaboration group to quickly understand a knowledge structure system of this book and can conveniently communicate with other readers who read the same book.

BRIEF DESCRIPTION OF DRAWINGS

The above features and advantages of the present invention can be better understood upon reading the detailed description of the embodiments of the present disclosure with reference to the accompanying drawings. Throughout the drawings, the components are not necessarily drawn to scale, and the components having similar related characteristics or features may be indicated by the same or similar reference numerals.

DETAILED DESCRIPTION OF THE PRESENT INVENTION

The present invention will be described below in detail by specific embodiments with reference to the accompanying drawings. It is to be noted that the aspects to be described hereinafter by specific embodiments with reference to the accompanying drawings are merely exemplary, and shall not be interpreted as any limitations to the protection scope of the present invention.

First Embodiment of the Book Information Collaboration System

Figure 1:
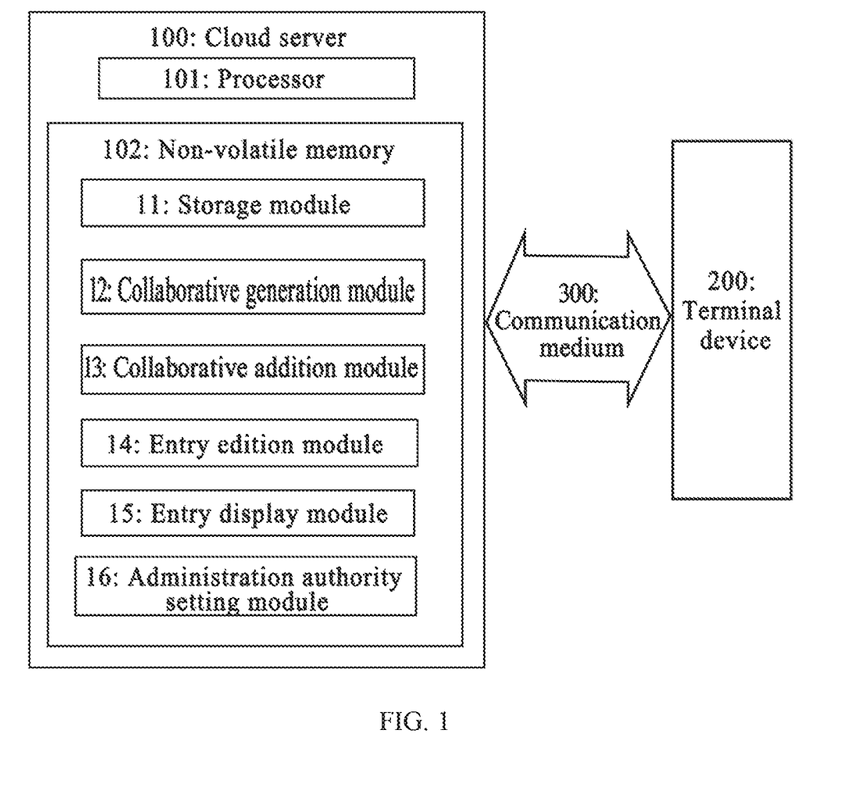
FIG. 1 shows a principle diagram of a first embodiment of a book information collaboration system according to the present invention.

FIG. 1 shows the principle of a first embodiment of a book information collaboration system according to the present invention. With reference to FIG. 1, the system in this embodiment includes: a terminal device 200, the terminal device including an application-specific integrated circuit; and, a cloud server 100 coupled to the terminal device via a communication medium 300, the cloud server 100 including one or more processors 101 and a non-volatile memory 102 storing instructions, wherein:

the instructions, when executed, cause the one or more processors 101 to receive instructions from the terminal device 200 via the communication medium 300, and the non-volatile memory 102 of the cloud server 100 includes: a storage module 11, a collaborative generation module 12, a collaborative addition module 13, an entry edition module 14 and an entry display module 15. The storage module 11 is configured to store book information. The book information includes, but is not limited to, book publication information and the entry structure of the book. The book publication information further includes author, press and version. The entry structure of the book further includes reconstruction of book contents by a user, multi-dimensional contents of the book, reader comments, reading motivations, and relevant contents of the book.

Figure 5:
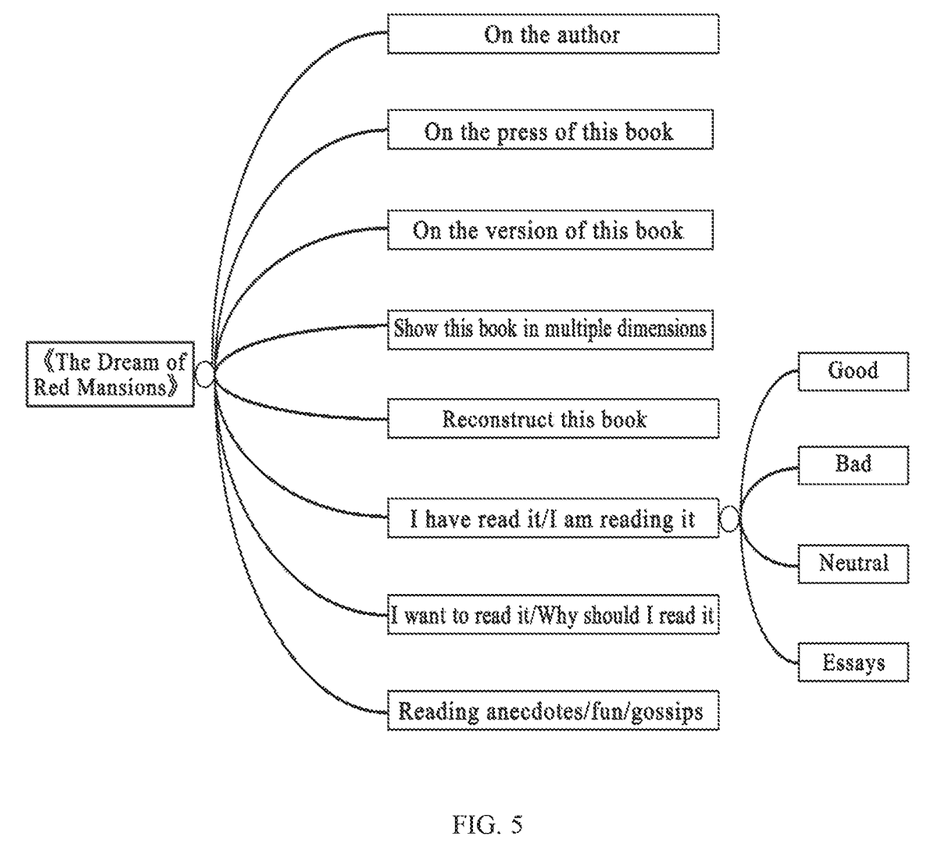
FIG. 5 shows an example of a book entry structure.

The collaborative generation module 12 is configured to, when a book is created for the first time, generate an open collaboration group using the book as a center and create a preset entry structure using the book as a root entry. The preset entry structure is shown in FIG. 5, where the symbol "〈〉" indicate that it is an open collaboration group. The called open collaboration group means that members in the collaboration group are not fixed.

The collaborative addition module 13 is configured to, when it is detected that a book object operated by a user is already created, automatically add the user in the open collaboration group corresponding to the created book, wherein the user's operation to the book includes search, read or recreate.

The entry edition module 14 is configured to allow members in the collaboration group to edit the entry structure corresponding to the collaboration group. Preferably, the non-volatile memory 102 further includes an administration authority setting module 16 configured to set an edition administration authority of the collaboration group, including granting an edition administration authority to a creator of the collaboration group by default or changing an edition administration authority of a member in the collaboration group. The entry display module 15 is configured to display in real time, to members in the collaboration group, the latest content of the entry structure edited by the members in the collaboration group. The user can update the latest content timely by a certain update operation, or the updated content can be automatically displayed by the system.

Second Embodiment of the Book Information Collaboration System

Figure 2:
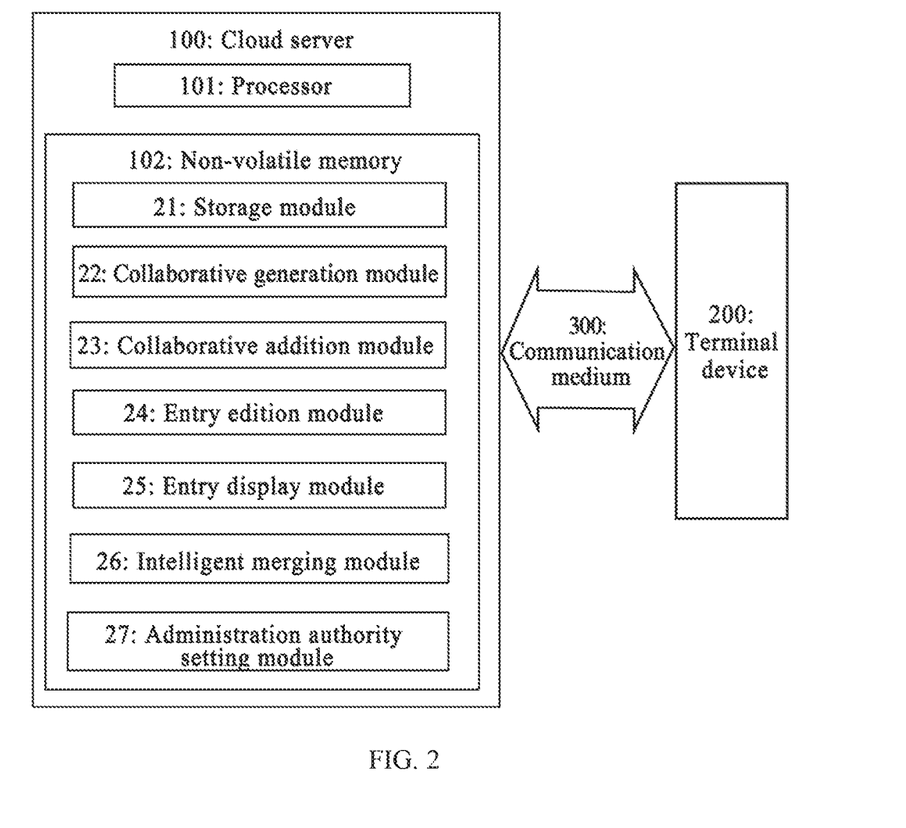
FIG. 2 shows a principle diagram of a second embodiment of the hook information collaboration system according to the present invention.

FIG. 2 shows the principle of a second embodiment of the book information collaboration system according to the present invention. With reference to FIG. 2, the system in this embodiment includes a terminal device 200, the terminal device including an application-specific integrated circuit; and, a cloud server 100 coupled to the terminal device via a communication medium 300, the cloud server 100 including one or more processors 101 and a non-volatile memory 102 storing instructions, wherein;

the instructions, when executed, cause the one or more processors 101 to receive instructions from the terminal device 200 via the communication medium 300, and the non-volatile memory 102 of the cloud server 100 includes: a storage module 21, a collaborative generation module 22, a collaborative addition module 23, an entry edition module 24, an entry display module 25 and an intelligent merging module 26.

The storage module 21 is configured to store book information. The book information includes, but is not limited to, book publication information and the entry structure of the book. The book publication information further includes author, press and version. The entry structure of the book further includes reconstruction of book contents by a user, multi-dimensional contents of the book, reader comments, reading motivations, and relevant contents of the book. The collaborative generation module 22 is configured to, when a book is created for the first time, generate an open collaboration group using the book as a center and create a preset entry structure using the book as a root entry. The preset entry structure is shown in FIG. 5, where the symbol "◊" indicate that it is an open collaboration group. The called open collaboration group means that members in the collaboration group are not fixed.

The collaborative addition module 23 is configured to, when it is detected that a book object operated by a user is already created, automatically add the user in the open collaboration group corresponding to the created book, wherein the user's operation to the book includes search, read or recreate. The entry edition module 24 is configured to allow members in the collaboration group to edit the entry structure corresponding to the collaboration group. Preferably, the system further includes an administration authority setting module 27 configured to set an edition administration authority of the collaboration group, including granting an edition administration authority to a creator of the collaboration group by default or changing an edition administration authority of a member in the collaboration group.

The intelligent merging module 26 is configured to merge the same or similar contents in the entry structure of the book by semantic recognition, including the same or similar reconstruction of book contents by users, the same or similar multi-dimensional contents of the book, the same or similar reader comments, the same or similar reading motivations and the same or similar relevant contents of the book. Generally, the entry structure is converted into texts. Then, based on the texts and according to the cosine similarity between entries and the cosine similarity between entries and texts, multiple texts are merged into one text. Finally, the merged text is converted into an entry structure. Generally, by such processing, the intelligent merging module can automatically merge multiple similar entry structures into a new entry structure. It is convenient for the management of entry structures and it is advantageous to improve the use experience of the user. The entry display module 25 is configured to display in real time, to members in the collaboration group, the latest content of the entry structure edited by the members in the collaboration group. The user can update the latest content timely by a certain update operation, or the updated content can be automatically displayed by the system.

First Embodiment of the Book Information Collaboration Method

Figure 3:
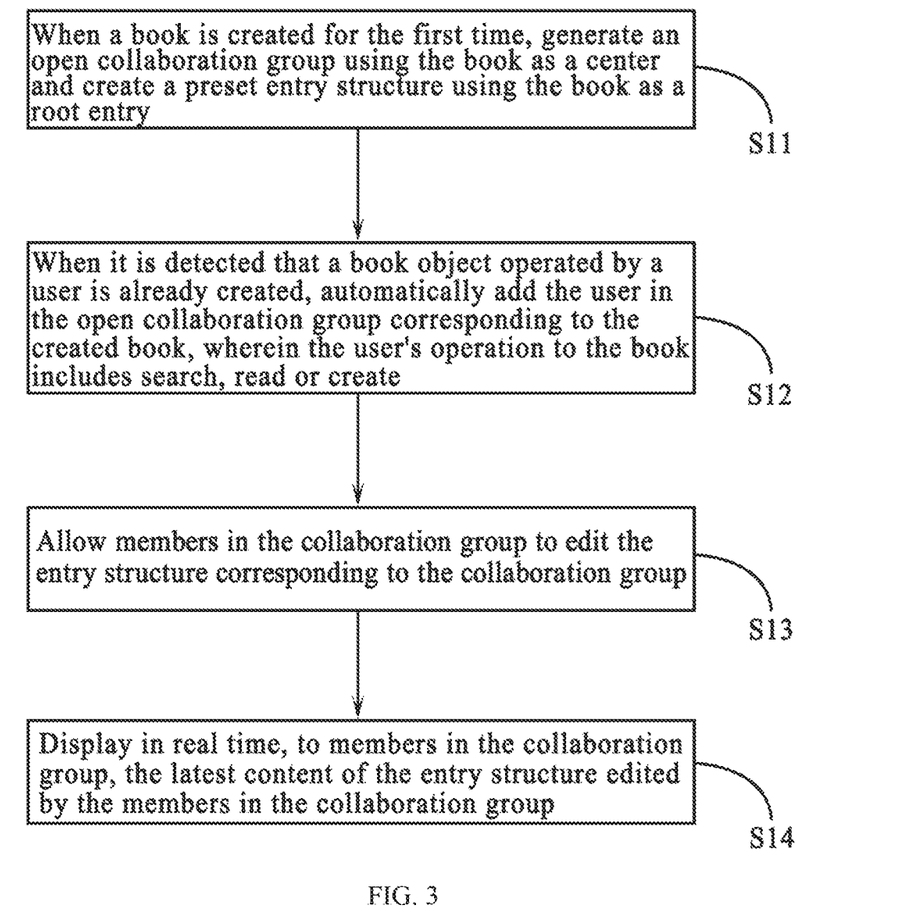
FIG. 3 shows a flowchart of a first embodiment of a book information collaboration method according to the present invention.

FIG. 3 shows a flowchart of a first embodiment of the book information collaboration method according to the present invention. With reference to FIG. 3, implementation steps of the method in this embodiment will be described below in detail.

A terminal device 200 transmits instructions to a cloud server 100 via a communication medium 300, the cloud server 100 including one or more processors 101 and a non-volatile memory 102 storing instructions. The following steps will be executed in the non-volatile memory 102.

Step S11: When a book is created for the first time, a collaborative generation module 12 generates an open collaboration group using the book as a center and creates a preset entry structure using the book as a root entry.

The entry structure includes book information. The book information includes, but is not limited to, book publication information and the entry structure of the book. The book publication information further includes author, press and version. The entry structure of the book further includes reconstruction of book contents by a user, multi-dimensional contents of the book, reader comments, reading motivations, and relevant contents of the book. Step S12: When it is detected that a book object operated by a user is already created, a collaborative addition module 13 automatically adds the user in the open collaboration group corresponding to the created book, wherein the user's operation to the book includes search, read or create.

Step S13: An entry edition module 14 allows members in the collaboration group to edit the entry structure corresponding to the collaboration group.

During the edition of the entry structure by a member, the member needs to follow restrictions to the edition administration authority. The system will set an edition administration authority for members in the collaboration group, including granting an edition administration authority to a creator of the collaboration group by default or changing an edition administration authority of a member.

Step S14: An entry display module 15 displays in real time, to members in the collaboration group, the latest content of the entry structure edited by the members in the collaboration group.

The user can update the latest content timely by a certain update operation, or the updated content can be automatically displayed by the system.

Second Embodiment of the Book Information Collaboration Method

Figure 4:
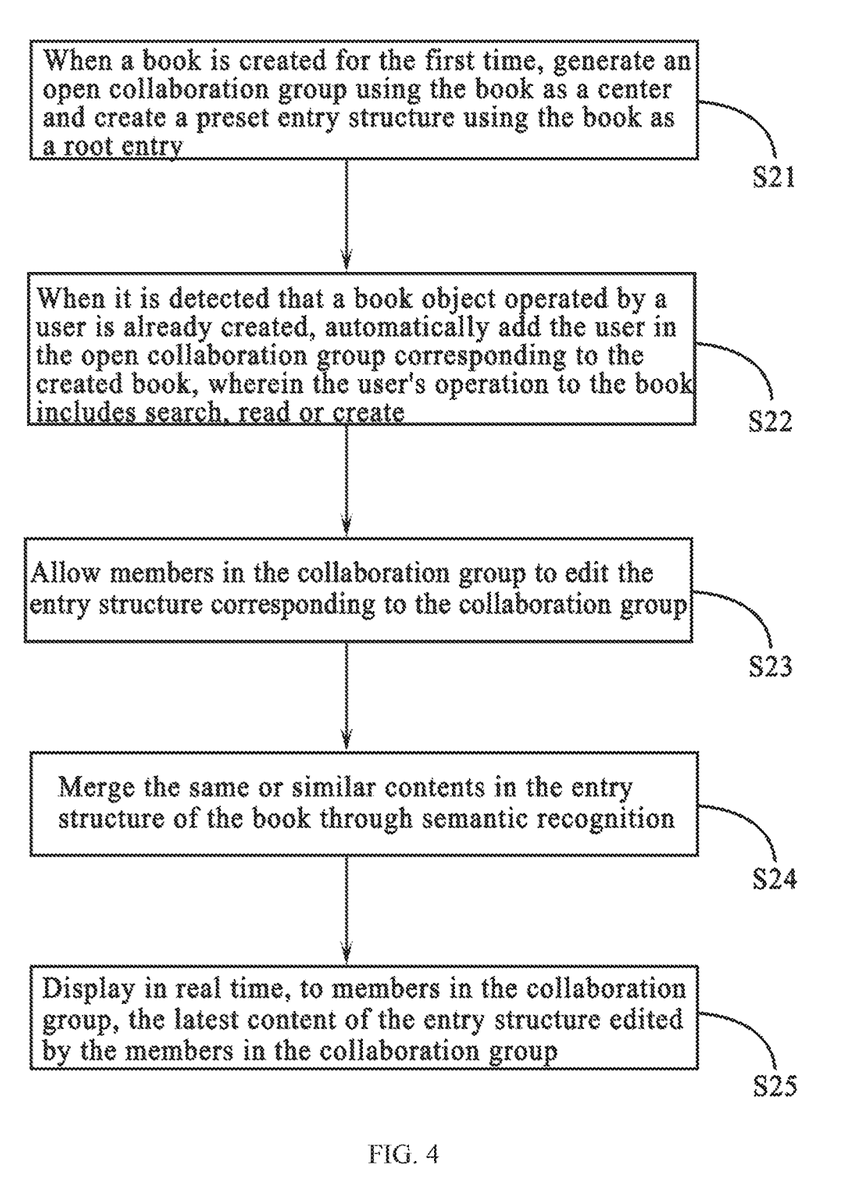
FIG. 4 shows a flowchart of a second embodiment of the book information collaboration method according to the present invention.

FIG. 4 shows a flowchart of a second embodiment of the book information collaboration method according to the present invention. With reference to FIG. 4, implementation steps of the method in this embodiment will be described below in detail. Step S21: When a book is created for the first time, a collaborative generation module 12 generates an open collaboration group using the book as a center and creates a preset entry structure using the book as a root entry. The entry structure includes book related information. The book related information includes, but is not limited to, book publication information and the entry structure of the book. The book publication information further includes author, press and version. The entry structure of the book further includes reconstruction of book contents by a user, multi-dimensional contents of the book, reader comments, reading motivations, and relevant contents of the book.

Step S22: When it is detected that a book object operated by a user is already created, a collaborative addition module 13 automatically adds the user in the open collaboration group corresponding to the created book, wherein the user's operation to the book includes search, read or create.

Step S23: An entry edition module 14 allows members in the collaboration group to edit the entry structure corresponding to the collaboration group.

During the edition of the entry structure by a member, the member needs to follow restrictions to the edition administration authority. The system will set an edition administration authority for members in the collaboration group, including granting an edition administration authority to a creator of the collaboration group by default or changing an edition administration authority of a member.

Step S24: An intelligent merging module 26 merges the same or similar contents in the entry structure of the book through semantic recognition.

The merged contents include the same or similar reconstruction of book contents by users, the same or similar multi-dimensional contents of the book, the same or similar reader comments, the same or similar reading motivations and the same or similar relevant contents of the book. Generally, the entry structure is converted into texts. Then, based on the texts and according to the cosine similarity between entries and the cosine similarity between entries and texts, multiple texts are merged into one text. Finally, the merged text is converted into an entry structure. Generally, by such processing, the intelligent merging module can automatically merge multiple similar entry structures into a new entry structure. It is convenient for the management of entry structures and it is advantageous to improve the use experience of the user. Step S25: An entry display module 25 displays in real time, to members in the collaboration group, the latest content of the entry structure edited by the members in the collaboration group.

The user can update the latest content timely by a certain update operation, or the updated content can be automatically displayed by the system.

Although the methods described above are shown and described as a series of actions for simplicity of explanation, it should be understood and appreciated that these methods are not limited to the order of actions. In accordance with one or more embodiments, some actions may be executed in a different order and/or be executed concurrently with other actions that are shown and described herein or are not shown and described herein but can be understood by those skilled in the art.

It will be further appreciated by those skilled in the art that the communication medium 300 refers to connections, digital subscriber lines (DSLs) or wireless technologies such as infrared, radio and microwave, which allow the transmission of data structures from websites, servers or remote sources via coaxial cables, optical cables or twisted-pair wires.

It will be further appreciated by those skilled in the art that the book accessed by the terminal device 200 includes text, picture, audio, video, multimedia or multi-language information.

It will be further appreciated by those skilled in the art that various illustrative logic blocks, modules, circuits and algorithm steps described by the embodiments disclosed herein can be implemented as electronic hardware, computer software or a combination thereof. To clearly illustrate the interchangeability of hardware and software, various illustrative components, blocks, modules, circuits and steps have been generally described above in terms of functionality. The implementation of such functionality as hardware or software depends on the specific application and the design constraints to the whole system. Technicians can implement the described functionality in (Efferent ways for each particular application, but such implementation decisions shall not be regarded as departing from the scope of the present invention. Various illustrative logic blocks, modules and circuits described by the embodiments disclosed herein can be implemented or executed by general-purpose processors, digital signal processors (DSPs), application-specific integrated circuit (ASICs), field programmable gate arrays (FPGAs) or other programmable logic devices, discrete gate or transistor logics, discrete hardware components, or any combination thereof that is designed to execute the functions described herein. The general-purpose processor may be a microprocessor. Alternatively, the processor may be any conventional processor, controller, microcontroller or state machine. The processor may also be implemented as a combination of computing devices, for example, a combination of a DSP and a microprocessor, multiple microprocessors, one or more microprocessors collaborated with the DSP core, or any other such configuration.

The steps of the methods or algorithms described in the embodiments disclosed herein may be directly embodied in hardware, a software module executed by the processor, or a combination thereof. The software module may reside in RAMS, flash memories, ROMs, EPROMs, EEPROMs, registers, hard disks, removable disks, CD-ROMs, or any form of storage media well-known in the art. The exemplary storage media are coupled to the processor so that the processor can read information from and write information in the storage media. Alternatively, the storage media may be integrated into the processor. The processor and the storage media may reside in the ASIC. The ASIC may reside in a user terminal. Alternatively, the processor and the storage media may reside in the user terminal as discrete components.

In one or more exemplary embodiments, the described functions may be implemented in hardware, software, firmware or any combination thereof if the functions are implemented as computer program products in software, the functions may be stored on computer readable media or transmitted via the computer readable media as one or more instructions or codes. The computer readable media include computer storage media and communication media, including any media that facilitate the transfer of computer programs from one location to another location. The storage media may be any available media accessible by a computer. As a non-limiting example, the computer readable media may include RAMs, ROMs, EEPROMs, CD-ROMs, or other optical disk storages, magnetic disk storages or other magnetic storage devices, or any other media that can be used to carry or store desired program codes in form of instructions or data structures and can be accessed by a computer. Any connections are also properly referred to as computer readable media. For example, if software is transmitted from web sites, servers or other remote sources by coaxial cables, optical fiber cables, twisted-pair wires, digital subscriber lines (DSLs) or wireless technologies such as infrared, radio and microwave, the coaxial cables, the optical fiber cables, the twisted-pair wires, the DSLs or the wireless technologies such as infrared, radio and microwave are included in the definition of media. Disks and discs as used herein include compact discs (CDs), laser discs, optical discs, digital versatile discs (DVDs), floppy disks and Blu-ray discs, wherein the disks often reproduce data magnetically, while the discs reproduce data optically by laser. The combinations of the above shall also be included in the scope of the computer readable media.

The foregoing description of the present disclosure is provided to enable any person skilled in the art to practice or utilize the present disclosure. Various modifications to the present disclosure will be apparent to those skilled in the art, and the general principles defined herein are applicable to other variations without departing from the spirit or scope of the present disclosure. Therefore, the present disclosure is not limited to the examples and designs described herein, and should be granted with the broadest scope consistent with the principles and novel features described herein.

What is claimed is:

1. A book information collaboration system, comprising:
a terminal device, the terminal device comprising an application-specific integrated circuit; and
a cloud server coupled to the terminal device via a communication medium, the cloud server comprising one or more processors and a non-volatile memory storing instructions, wherein:
the instructions, when executed, cause the one or more processors to receive instructions from the terminal device via the communication medium,
the non-volatile memory of the cloud server comprises:
a storage module configured to store book information, wherein the book information comprises: book publication information and the entry structure of the book; the book publication information comprises author, press and version; and, the entry structure of the book comprises reconstruction of book contents by a user, multi-dimensional contents of the book, reader comments, reading motivations, and relevant contents of the book;
a collaborative generation module configured to, when a book is created for the first time, generate an open collaboration group using the book as a center and create a preset entry structure using the book as a root entry;
a collaborative addition module configured to, when it is detected that a book object operated by a user is already created, automatically add the user in the open collaboration group corresponding to the created book, wherein the user's operation to the book comprises search, read or create;
an entry edition module configured to allow members in the collaboration group to edit the entry structure corresponding to the collaboration group;
an entry display module configured to display in real time, to members in the collaboration group, the latest content of the entry structure edited by the members in the collaboration group, and to automatically display updates of the content in the entry structure edited by the members in the collaboration group; and
an intelligent merging module configured to merge same or similar contents in the entry structure of the book by semantic recognition, including same or similar reconstruction of book contents by users, same or similar multi-dimensional contents of the book, same or similar reader comments, same or similar reading motivations and same or similar relevant contents of the book, wherein the intelligent merging module is configured to merge same or similar contents in the entry structure of the book by: converting the entry structure into texts; merging texts, according to cosine similarity between entries and cosine similarity between entries and texts; and
converting the merged text into a new entry structure.

2. The book information collaboration system according to claim 1, wherein,
the non-volatile memory of the cloud server further comprises:
an administration authority setting module configured to set an edition administration authority of the collaboration group, comprising granting an edition administration authority to a creator of the collaboration group by default.

3. A book information collaboration method, comprising steps of:
transmitting instructions to a cloud server by a terminal device via a communication medium, the cloud server comprising one or more processors and a non-volatile memory storing instructions;
when a book is created for the first time, generating, by a collaborative generation module of the non-volatile memory, an open collaboration group using the book as a center and creating a preset entry structure using the book as a root entry wherein the book information comprises: book publication information and the entry structure of the book; the book publication information comprises author, press and version; and, the entry structure of the book comprises reconstruction of book contents by a user, multi-dimensional contents of the book, reader comments, reading motivations, and relevant contents of the book;
when it is detected that a book object operated by a user is already created, automatically adding, by a collaborative addition module of the non-volatile memory, the user in the open collaboration group corresponding to the created book, wherein the user's operation to the book comprises search, read or create;
allowing, by an entry edition module of the non-volatile memory, members in the collaboration group to edit the entry structure corresponding to the collaboration group;
displaying in real time, by an entry display module of the non-volatile memory and to members in the collaboration group, the latest content of the entry structure edited by the members in the collaboration group, and automatically displaying updates of the content in the entry structure edited by the members in the collaboration group; and
merging, by an intelligent merging module, same or similar contents in the entry structure of the book by semantic recognition, including same or similar reconstruction of book contents by users, same or similar multi-dimensional contents of the book, same or similar reader comments, same or similar reading motivations and same or similar relevant contents of the book, wherein merging same or similar contents in the entry structure of the book is performed by: converting the entry structure into texts; merging texts, according to cosine similarity between entries and cosine similarity between entries and texts; and converting the merged text into a new entry structure.

4. The book information collaboration method according to claim 3, further comprising a step of:

setting, by an administration authority setting module, an edition administration authority of the collaboration group, comprising granting an edition administration authority to a creator of the collaboration group by default.

\* \* \* \* \*